Patented Apr. 10, 1928.

1,665,233

UNITED STATES PATENT OFFICE.

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY.

PROCESS FOR MAKING FURFURAL RESINS.

No Drawing. Application filed May 26, 1924, Serial No. 715,815. Renewed February 27, 1928.

This invention pertains to methods or processes for making resinous materials from furane derivatives and more particularly to processes for making furfural resins.

It is the purpose of this invention to provide a rapid, inexpensive and efficient process for making resinous materials from furane derivatives. More specifically, one of the objects of this invention is to provide an efficient catalyst for causing rapid resinification of furane derivatives and particularly furfural.

A further object of this invention is to provide a non-corrosive catalyst for this purpose so that after the resin has been formed any slight quantities of the catalyst which may remain in the resin will impart no undesirable properties thereto. Furthermore, it is an object of this invention to provide a catalyst, all or a part of which if desired may be allowed to remain in the resinous material without imparting any qualities thereto which would render the resin undesirable for most uses.

Under properly controlled conditions certain reactions will take place in furane derivatives, such as furfural, resulting in the formation of resinous materials. We have discovered that such reactions may be made to take place by at least three different methods. First, furfural by itself may be continuously heated for a long period of time and after several months the reaction will be manifested by the formation of small amounts of soft resinous material. Second, furfural may be allowed to stand without heating for a year or more in the presence of a suitable catalyst and the reaction will also manifest itself by a slight resinification. Third, a furane derivative, such as furfural, may be heated in the presence of a catalyst and resinification will take place much more quickly than with the independent use of either heat or a catalyst.

We have discovered that under properly controlled conditions various salts act as very efficient catalysts for use in the resinification of furane derivatives, such as furfural. Among the catalysts we have found effective are aluminum chloride, ferric chloride, lead acetate and iron pyromucate. Under most conditions aluminum chloride is slightly more effective, and iron pyromucate is slightly less effective than the other salts named. A catalyst comprising a single salt of the desired effectiveness may thus be selected or if desired, two or more of the salts named may be mixed to secure an inexpensive catalytic substance having the desired effectiveness.

While several metallic salts have been enumerated above which serve effectively as catalysts for the reaction in producing a furfural resin from furfural, it is conceivable that many other metallic salts will act in a similar manner and, therefore, the term "metallic salt that serves as a catalyst for the reaction" refers to those metallic salts only which act in the nature of catalytic agents in producing a furfural resin from furfural.

These salts may be preferably added in a dry condition to the furfural in quantities amounting to substantially 1% of the weight of the furfural. The furfural is then heated while being constantly agitated. If furfural is treated in this manner, using aluminum chloride as a catalyst, the resinification will become manifest by the formation of a jelly-like substance after several hours heating at a temperature approximating 100° C. However, in order to secure a more rapid rate of reaction for commercial purposes, the use of higher temperatures above atmospheric pressure is desirable. In fact, the rate at which the reaction takes place may be readily controlled either by the form of catalyst or combination of catalysts used or by regulation of the temperature.

As the reaction proceeds a soft viscous resin first forms which later changes to a semi-solid stage. The resin in this form is fusible and is soluble in acetone and the like but is insoluble in water. If the reaction is allowed to proceed to a conclusion, the fusible, soluble product is transformed into an infusible, insoluble solid.

In most cases, the character of the product may be easily controlled by merely removing the resinous material from contact with the catalyst or if desired, the catalyst may be made ineffective by dilution with an inert liquid, such as water.

In the event that all or a part of the salts used as catalysts are not removed from the product, their presence in the dry state and in the small quantities mentioned will impart no undesirable qualities to the resin for most uses. The use of these comparatively inactive materials, especially in a dry state, accordingly offers many advantages over the use of solutions of active reagents. Strongly active reagents, if not entirely removed from the product, would of course corrode the moulds used in shaping objects made of the product and also seriously impair the electrical insulation properties and stability of the product.

By thus properly controlling the speed and extent of the reaction as above described, we are able to secure a product of various degrees of consistency depending upon the stage at which the reaction is stopped. Furthermore, the resulting product formed from stopping the reaction at any particular intermediate stage may be substantially permanently retained at its existing consistency by the removal of the catalyst.

Since the reaction is readily controlled in accordance with our invention and may be arrested at any stage in the resinification of the furane derivative, the resulting resins are adaptable to the various well known uses of the natural and synthetic resins.

Throughout this application we have employed the term "furane derivative". It is to be understood, however, that by this term is meant a chemical compound containing no other ring nucleus but the furane ring, as distinguished from a furane compound which is a chemical compound containing another ring nucleus or other ring nuclei besides the furane ring.

It will be understood that various changes and substitutions of equivalents may be made without departing from the scope and principle of the invention set forth or intended to be set forth in the appended claims.

Having thus described our invention, what we claim as new and desire to secure by Letters Patent of the United States, is:

1. The process of making a furfural resin which comprises heating furfural in the presence of a metallic salt which is present in a quantity only to serve as a catalyst for the reaction.

2. The process of obtaining a resinous substance which comprises treating furfural with a metallic salt that serves as a catalyst for the reaction.

3. The process of obtaining a resinous reaction product which comprises subjecting furfural to the action of a metallic salt which is present in a quantity only to serve as a catalyst for the reaction, and to such temperature as to produce a fusible soluble resin.

4. The process of obtaining a furfural resin which comprises submitting furfural with a metallic salt that serves as a catalyst for the reaction to such temperature and pressure as to produce a fusible soluble resin.

5. The process of obtaining a furfural resin which comprises heating furfural under pressure with a metallic salt serving as a catalyst for the reaction to a temperature above the atmospheric boiling point of furfural until a fusible soluble resin is formed.

6. The process of obtaining a furfural resin which comprises heating furfural with a catalyst embodying at least one metallic salt that serves as a catalyst for the reaction to such a temperature and under such pressure that a non-gelatinous resinous reaction product is produced.

In witness whereof, we have hereunto subscribed our names.

CARL S. MINER.
JOHN P. TRICKEY.